United States Patent [19]

Wilson

[11] Patent Number: 5,652,813
[45] Date of Patent: Jul. 29, 1997

[54] LINE BI-DIRECTIONAL LINK

[75] Inventor: Randall Brian Wilson, Maplewood, N.J.

[73] Assignee: The Whitaker Corporation, Wilmington, Del.

[21] Appl. No.: 414,268

[22] Filed: Mar. 31, 1995

[51] Int. Cl.$^6$ ..................................................... G02B 6/28
[52] U.S. Cl. ..................................................... 385/24
[58] Field of Search .................................. 359/154, 173; 385/15, 24, 88, 89, 90, 91, 92, 93, 94

[56] References Cited

U.S. PATENT DOCUMENTS

| | | | |
|---|---|---|---|
| 4,369,524 | 1/1983 | Rawson et al. | 385/2 |
| 4,493,113 | 1/1985 | Forrest et al. | 455/606 |
| 4,549,085 | 10/1985 | Ulijasz | 250/551 |
| 4,577,209 | 3/1986 | Forrest et al. | 357/30 |
| 4,709,413 | 11/1987 | Forrest et al. | 455/606 |
| 4,736,359 | 4/1988 | Cohen et al. | 370/3 |
| 4,797,179 | 1/1989 | Watson et al. | 156/647 |
| 4,909,584 | 3/1990 | Imoto et al. | 350/96.15 |
| 4,978,189 | 12/1990 | Blonder et al. | 350/96.12 |
| 5,020,153 | 5/1991 | Choa et al. | 455/606 |
| 5,031,188 | 7/1991 | Koch et al. | 372/50 |
| 5,127,075 | 6/1992 | Althaus et al. | 385/94 |
| 5,144,637 | 9/1992 | Koch et al. | 372/50 |
| 5,305,133 | 4/1994 | Cooper et al. | 359/152 |

FOREIGN PATENT DOCUMENTS

| | | | |
|---|---|---|---|
| 0 053 742 | 6/1982 | European Pat. Off. | H01L 31/12 |
| 3217610 A1 | 11/1983 | Germany | G02B 5/176 |

OTHER PUBLICATIONS

PCT International Search Report. International Application No. PCT/US96/03013. International Filing Date Jun. 3, 1996.

*Technical Digest—Western Electric;* "Optical Transceiver"; No. 64, Oct. 1981; p. 39; Miller.

*Primary Examiner*—John Ngo
*Attorney, Agent, or Firm*—W. S. Francos

[57] ABSTRACT

A bi-directional optical link, comprising: a light source for transmitting light at a first wavelength; a photodetector in substantially linear arrangement with the light source for detection of light of a second wavelength; and an optical fiber for carrying light of the second wavelength to the photodetector and for carrying light of the first wavelength from the light source, the optical fiber in substantially linear arrangement with the photodetector and the light source.

30 Claims, 4 Drawing Sheets

LINE BI-DIRECTIONAL LINK

FIELD OF THE INVENTION

The invention of the present disclosure relates to a colinear bi-directional link that makes use of a PIN detector that detects at one wavelength, and is transparent to a second wavelength.

BACKGROUND AND SUMMARY OF THE INVENTION

The greater bandwidth and low transmission loss of optical fibers coupled with the high speed capabilities of optical devices has led to the evolution of high data rate transmission systems in the telecommunications industry. Optically based transmitters and receivers have enabled transceiver modules to evolve in a variety of forms, all to accomplish two directional communications at optical frequencies with simultaneous transmission and reception (full-duplex) or at sequential transmission and reception (half-duplex).

By and large, transceiver based systems utilize two optical fibers to accomplish this goal, one to transmit light signals from the transmitter side of the module and a second fiber to acquire the optical signal for the receiver side. More recently, interest has centered on transceiver designs which utilize a single optical fiber for both the transmission and reception of the optical signal. Modules which utilize this single fiber approach we refer to here as bi-directional modules. In general, these can be of two subtypes, systems which transmit and receive optical radiation at the same wavelength, and systems which utilize two different wavelengths, one for transmission in one direction and a second wavelength for transmission in the opposite direction. These are referred to as single wavelength bi-directional and dual wavelength bi-directional, respectively. The present disclosure refers to the latter type of configuration.

The conventional art in the optical design of dual wavelength bi-directional modules typically utilizes a semiconductor source such as an LED or injection laser, a semiconductor photodetector such as a PIN photodetector or APD, a beam splitting component, and additional filters and focusing optical elements. A conventional dual wavelength bi-directional module is as disclosed in U.S. Pat. No. 5,127,075 to Althaus et al, the disclosure of which is specifically incorporated herein by reference. The beam splitting component is utilized to spatially separate the incoming and outgoing light signals, directing the outgoing transmission signal from the source onto the fiber and directing the incoming signal from the fiber to the detector. Dichroic filters can be used to prevent source radiation from reaching the detector and to prevent incoming signals from the fiber from reaching the source. In some designs, the filter functions are built into the beam splitting element. Focusing elements can be used to maximize the optical coupling between the source and the fiber and the fiber and the detector. The present disclosure proposes an in-line configuration of the detector and source, which is enabled by a special design of the photodetector component utilized in the assembly.

The use of photodetectors has been rather widespread, and with the emerging potential for fiber to the home (FTTH) applications, there is a demand for increased application. One such application is for use in a transceiving mode, in particular a bi-directional link. While some bi-directional links are in the form of packaged devices in a housing orthogonal to one another having wavelength selective optics to effect the transmission of one wavelength from an LED or laser, and reception of another wavelength into a detector, these configurations are often undesirable. The drawback for many applications is the need to effect alignment of the fiber, devices and optics, creating a labor intensive and therefore a higher cost product. Furthermore, these devices require beam splitting and/or filtering elements to assure that signals are properly directed from and to the respective transmitter and detector devices. The push for the FTTH application requires a low cost product.

The basic performance of a PIN photodetector is described presently. Semiconductor pn junctions are employed widely for photodetection. The basic physics of their use in this application is as follows. Turning to FIG. 1, we see the energy band diagram of a pn junction used as a photodetector. Light absorbed at the p region of the junction, creating an electron-hole pair as shown. If the absorption of the light occurs at a point of the p-side that is within a diffusion length (the average length that a minority carrier will diffuse before recombining with an opposite carrier) of the depletion region edge, the electron has a high probability of being collected and will drift across the depletion region. Such an electron will then contribute a charge e to the external circuit, thereby giving an electrical indication of the optical signal absorbed by the junction photodiode. Should the light be within the absorption band of the detector and be received on the n-side of the depletion region of the junction, another electron-hole pair will be created, and the hole will traverse to the junction again by diffusion, and then drift across the junction. Again, this will result in a charge flow e across the external load. Alternatively, and preferably, the photon could be absorbed within the depletion region, creating an electron-hole pair. The electron and hole created will drift in opposite directions under the field of the bias potential. In this arrangement, each carrier will traverse a length that is less than the depletion width and the contribution to the charge flow in an external circuit is e as determined from basic transport equations. This method is most desirable, since each absorption gives rise to a charge of magnitude e, and the delay in current response time due to finite diffusion time is minimized. This mode of operation is effected by fabricating a structure having a layer of intrinsic (i) semiconductor sandwiched between the p and n layer, and is conventionally referred to as a PIN diode. In practice this layer is unintentionally doped due to the uncontrollable background impurities, but typically is characterized by a background n-type carrier concentration of $3 \times 10^{15}/cm^3$ or less. For the purposes of discussion of the invention of the present application, intrinsic is understood to be the above definition. The intrinsic layer is a high resistivity layer and the potential drop of the bias potential is greatest across the intrinsic layer. Furthermore, the intrinsic layer is generally made thick enough to assure that most incident photons are absorbed within this layer.

In FIG. 2, we see a cross sectional view of a conventional PIN photodetector for application in the near IR region between 1.0–1.65 microns. The intrinsic absorption layer consists of $In_xGa_{1-x}As$ ternary material which is epitaxially grown lattice matched on a semiconductor substrate. The substrate is generally chosen to be transparent in the wavelength range desired to be detected, and in the case of an $In_xGa_{1-x}As$ absorption layer, an $n^+$ InP substrate is chosen as it is transparent in the range 1.0–1.65 microns in wavelength. Under operating conditions, the intrinsic layer is depleted fully by a top pn junction. The PIN structure can be achieved by simply growing a top layer of $p^+$ $In_xGa_{1-x}As_yP_{1-y}$ or InP over a layer of intrinsic $In_xGa_{1-x}As$ (not shown), but in most practical devices, fabrication is effected by having a localized p+ region 201 formed by diffusion of a suitable dopant, for example Zn, into the cap layer of InP or $In_xGa_{1-x}As_yP_{1-y}$ through a suitable mask, for example $SiO_2$ deposited by conventional techniques on the top layer. The desired effect of this practical technique of fabrication is a planar structure, with a well defined junction area (by virtue of the mask diffusion technique) and minimum surface current leakage by virtue of the buried junction. A PIN photodetector of this structure can be illuminated either from the top through the pn junction or from the rear through the transparent InP substrate if a suitable opening in the n-side metallization is provided.

The device operates under the condition of reverse bias to effect the desired field direction to facilitate carrier flow upon absorption of light of the proper wavelength. The reverse bias potential of a few volts is usually enough to fully deplete the intrinsic layer of carriers, and in the absence of light signals, only a small reverse current flows across the boundaries. Finally, it is important to recognize that due to the absence of a gain mechanism in the PIN diode, the gain-bandwidth product is nearly equal to the bandwidth itself, the bandwidth determined by the transit time of electron-hole pairs, and accordingly by the thickness of the intrinsic layer. Accordingly, the thickness of the intrinsic layer's effect on absorption efficiency must be balanced against the effect on time of transit. In practice, the bandwidth of the PIN detector is limited by factors such as the RC time constant of the packaged device, and bandwidths on the order of several GHz are achievable.

One way to effect a more simple, and thereby lower cost product is to fabricate an in-line bi-directional link. In U.S. Pat. No. 4,577,209 to Forrest, et al., the disclosure of which is specifically incorporated herein by reference, a bi-directional link is disclosed that is a PIN detector having a bored center section for the insertion of an optical focusing element fiber. An LED or other source is in communication with the fiber through the hole in the PIN detector, and thus a bi-directional link is effected. The link disclosed in this reference is based on a single wavelength, and attempts to reduce the detrimental effects of radiation traveling in one direction which can be reflected from light-reflecting interfaces in the system. This will result in signal interference and cross-talk. U.S. Pat. No. 4,709,413 which is related to the '209 reference and the disclosure of which is also specifically incorporated herein by reference, like the '209 reference attempts to provide signal or channel isolation in single wavelength bi-directional links.

Both of these references require a hole etched in the detector through to a light source, the hole in one embodiment having a coupling member, such as a fiber disposed therein, and an active area of a detector that is designed to capture all of the radiation incident thereon from a fiber. The systems of this reference attempt to effect a bi-directional link that provides good isolation between the transmitter and receiver. However, the systems disclosed in these references are not designed to effect communication using multiple wavelengths and cannot achieve the degree of isolation that is effected in a multiple wavelength system. These systems require the alignment of the optical fiber to the active area of the device to maximize the incident radiation on the active area of the detector, as well as alignment of the source to a coupling element or the opening of the fiber. To reiterate, the inventions of the referenced patents do not achieve the isolation of the signals and require labor intensive alignment of the various components of the system. What is needed is a system that will effect isolation between the transmitted and received signals, preferably by the use of one wavelength of light for signal transmission, and one for signal reception in an in-line system. Furthermore, what is needed is a system that does not require a great deal of optical coupling elements, and thus optical alignment or complex fabrication techniques.

SUMMARY OF THE INVENTION

The invention of the present disclosure is an in-line bi-directional fiber-optic link that transmits at one optical wavelength, and receives at another optical wavelength. The link is anticipated to be the low cost transceiver unit serving as one of many such links between a main transceiver station and a large number of end users. For example, the device could well be the low cost transceiver for FTTH applications, as well as many other such applications. To effect the desired low-cost transceiver link, a PIN diode is fabricated having an $In_xGa_{1-x}As_yP_{1-y}$ intrinsic layer instead of the usual $In_xGa_{1-x}As$ intrinsic layer and which is engineered to have a bandgap corresponding to a wavelength of about 1.4 microns. In line with this detector is a light source that emits at roughly 1.55 microns. Accordingly, the detector will receive light from a fiber at, for example 1.3 microns, but will be effectively transparent to light emitted from the transmitter. Finally, an integral focusing element is utilized to effect fiber to source device coupling.

OBJECTS, FEATURE AND ADVANTAGES OF THE INVENTION

It is an object of the present invention to have an in-line bi-directional optical link that provides high isolation between the transmitted and received signals.

It is a feature of the present invention to have a photodetector that detects at a one wavelength, the reception wavelength, and that is transparent to a another wavelength, the transmission wavelength.

It is a further feature of the present invention to have a PIN photodetector that has an intrinsic layer that is fabricated with a bandgap of an energy that absorbs the reception wavelength, and is transparent to the transmission wavelength.

It is a further feature of the present invention to have an optical coupling element that is integral with the photodetector and couples light from the transmission light source into the fiber.

It is an advantage of the present invention to have a bi-directional link that does not use a beam splitting or filtering function to effect signal isolation.

DETAILED DESCRIPTION OF THE PREFERRED EMBODIMENTS

Figure 1:
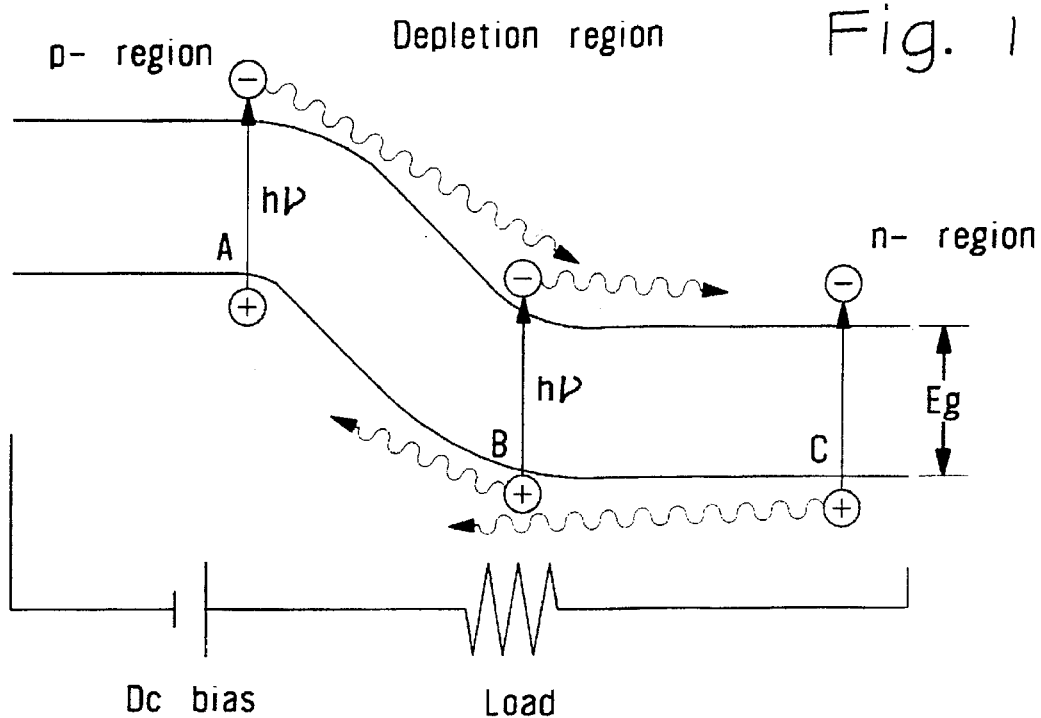
FIG. 1 is an energy band diagram of a conventional PIN photodetector.
Figure 2:
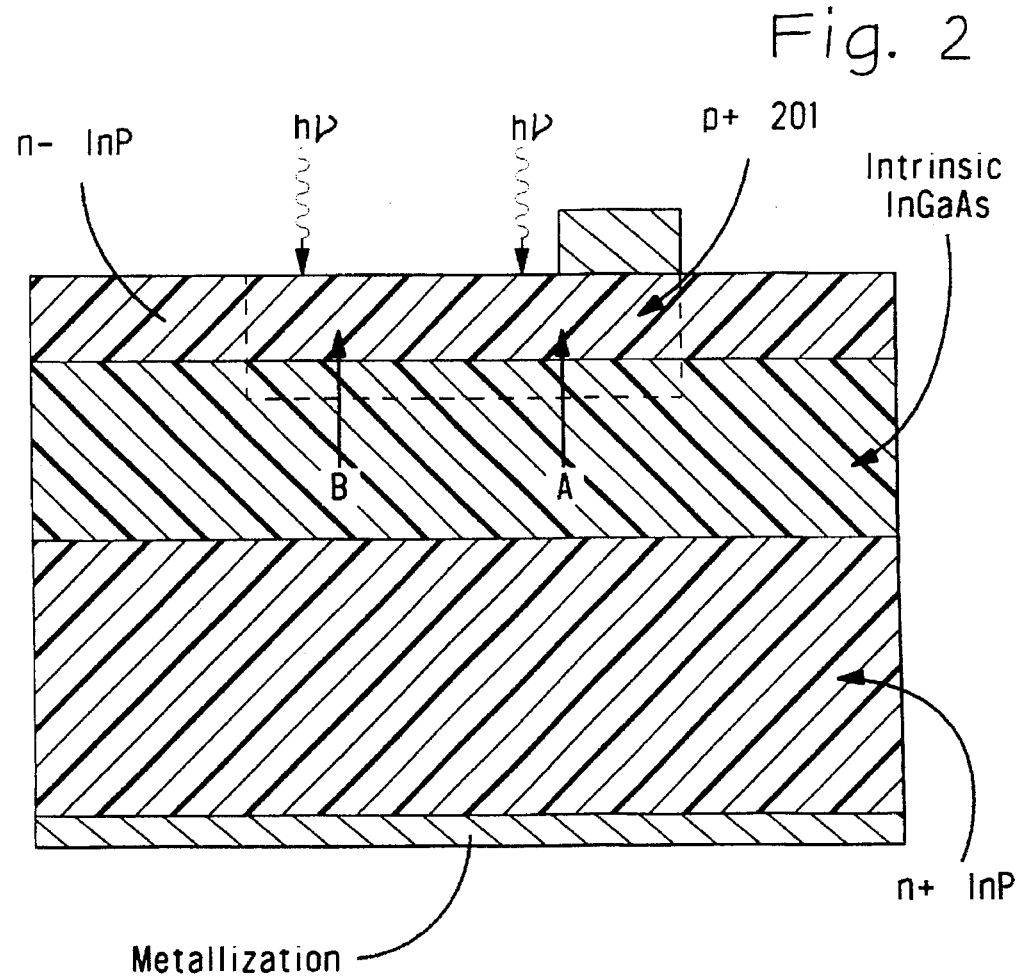
FIG. 2 is a cross-sectional view of a typical PIN photodetector.
Figure 3:
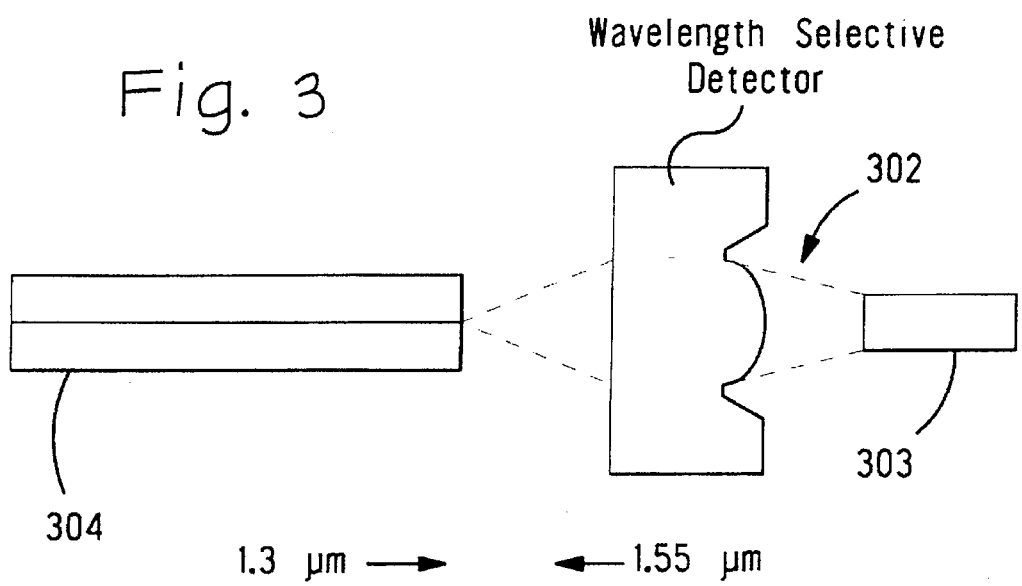
FIG. 3 is a cross-sectional view of the system of the present invention.

Turning to FIG. 3, we see the schematic layout of the link of the present. The wavelength selective detector 301 has disposed thereon an integral lens 302. The light signal that is emitted from the light source is coupled to the optical fiber 304 by the lens 302. This describes the basic transmission function. The detector 301 is, as briefly described above, and as will be described later in much greater detail, transparent to light emitted from the light source. Exemplary, the wavelength of this light is 1.55 microns. In its mode as a receiver, the detector 301, will detect light at wavelengths less than a threshold value. Furthermore, the detector 301 has a detection area that is substantially larger than the area of the incident radiation emitted from the fiber 302. Thereby, the light is substantially absorbed by the detector and the light at the reception wavelength is not incident on the light source, as this could have adverse affects on the light source. As can be appreciated, the design of the present bi-directional link enables the light from the transmitting light source 303 to be transmitted through the detector 301 with minimal cross talk. On the other hand, the light received from the fiber at the detector is absorbed by the detector and does not impinge upon the light source 303. Having described the basic apparatus and function,other configurations are possible. Preferably, the light source is an edge emitting laser or LED, however, a surface emitting device such as a vertical cavity surface emitting laser (VCSEL) may also be used with the configuration. In this case, the VCSEL could be merely stacked on the detector. The detector 301 is a PIN detector having an $n^+$–InP substrate, an intrinsic $In_xGa_{1-x}As_yP_{1-y}$ layer and an InP layer into which is selectively diffused an acceptor agent such as Zn to form the $p^+$ layer. The details of the fabrication are explained later. The lens 302 as shown is preferably integral with the detector and recessed, and can be fabricated by techniques such as are described in U.S. Pat. No. 4,797,179 to Watson, et al an assigned to the present assignee. The disclosure is specifically incorporated herein by reference. It is also feasible to fabricate a holographic focusing element on the detector. To this end, a layer of amorphous $SiO_2$ is deposited on the lower surface of the substrate of the detector. A photoresist is then spin coated having a pattern that effects the desired grating of the hologram. A preferred technique of the fabrication of the hologram is as described in U.S. patent application Ser. No. 08/198,028 assigned to the assignee of the present invention. The disclosure of this application is hereby specifically incorporated herein by reference. While the application referenced above describes the fabrication on silicon wafers, this technique can be used on the substrate of the present invention. Thereby a hologram can be used as the optical coupling from the laser/LED to the fiber 304 instead of a refractive lens.

Figure 4:
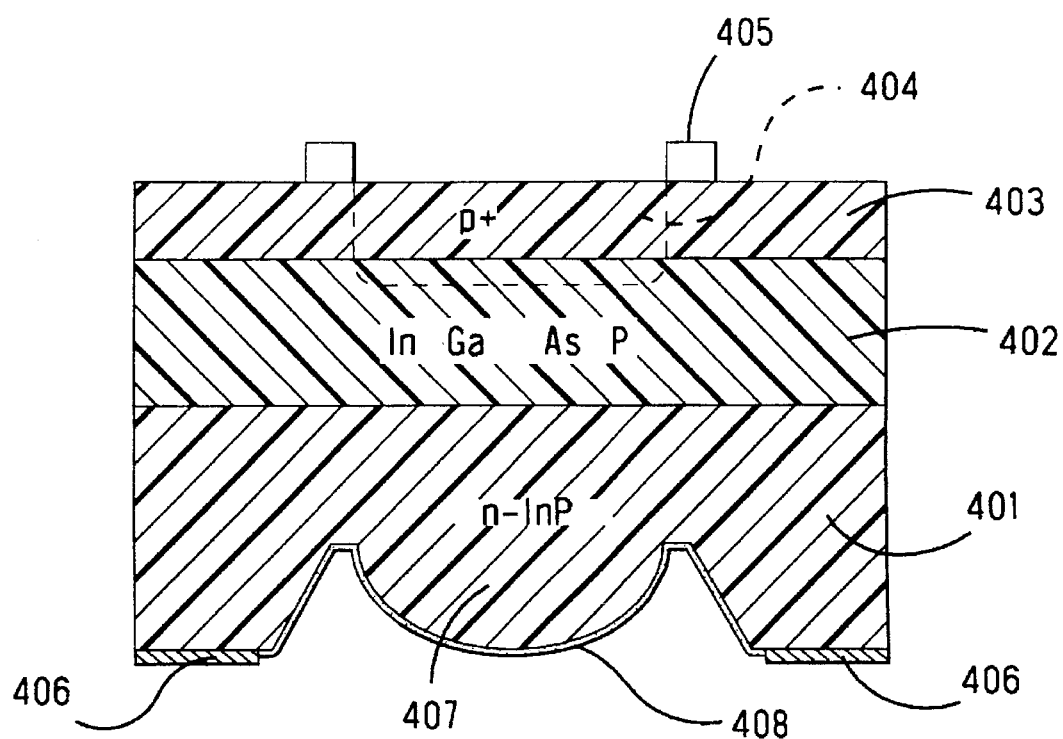
FIG. 4 is a cross-sectional view of the PIN detector of the present invention.
Figure 5:
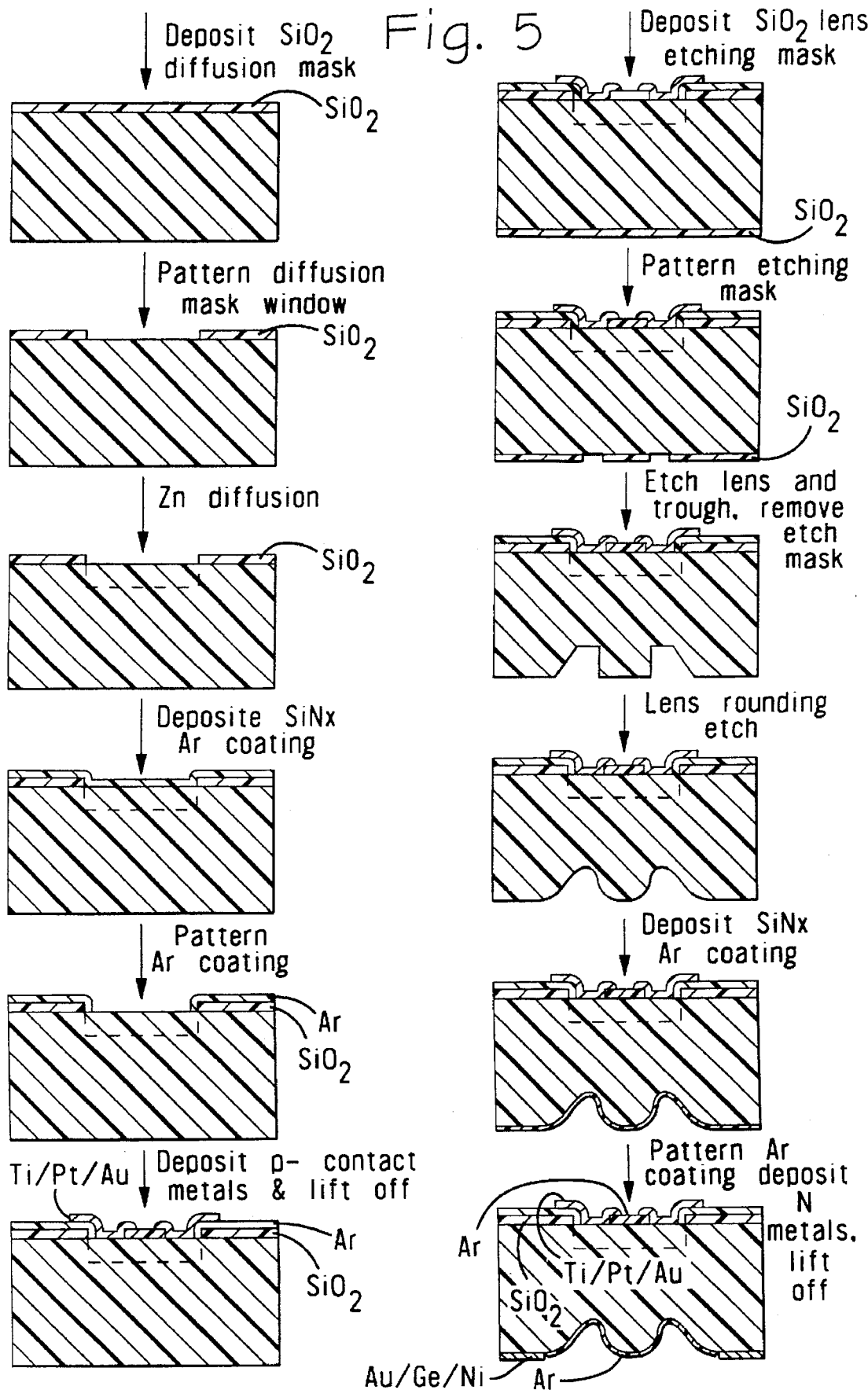
FIG. 5 is a cross-sectional view of the fabrication steps of the present invention.

In FIG. 4, a schematic cross-section of the wavelength selective detector is shown which can be fabricated as follows. A lattice matched epitaxial layer structure is grown by conventional techniques such as MOCVD, VPE, LPE or MBE, consisting of: an n-doped InP buffer layer 401 (0.3–3 microns thick), an undoped $In_xGa_{1-x}As_yP_{1-y}$ intrinsic layer (1.5–3.0 microns thick) 402; an undoped InP or $In_xGa_{1-x}As_yP_{1-y}$ cap layer (0.5–1.0 microns thick) 403. In the case where an $In_xGa_{1-x}As_yP_{1-y}$ cap layer 403 is used, the bandgap is adjusted to be greater than 1.0 eV. The bandgap of the intrinsic layer 402 is adjusted to have a nominal value of 0.89 eV corresponding to a nominal wavelength of 1.4 microns. Following the epitaxial growth step, conventional PIN wafer fabrication techniques, known to the skilled artisan, are utilized to complete the device structure. A typical fabrication sequence is as shown in FIG. 5.

Turning back to FIG. 4, we see the device with the lens 407 fabricated thereon. As stated the lens is grown by a technique disclosed in the patent to Watson, et al, referenced above. In this technique a recessed integral lens is fabricated, as described therein, on the substrate side of the LED. However, this same technique can be used to fabricate an identical recessed lens structure 407 on the substrate side of the present PIN detector, as shown in FIG. 4. An anti-reflective coating is then deposited as shown by conventional techniques.

Figure 6A:
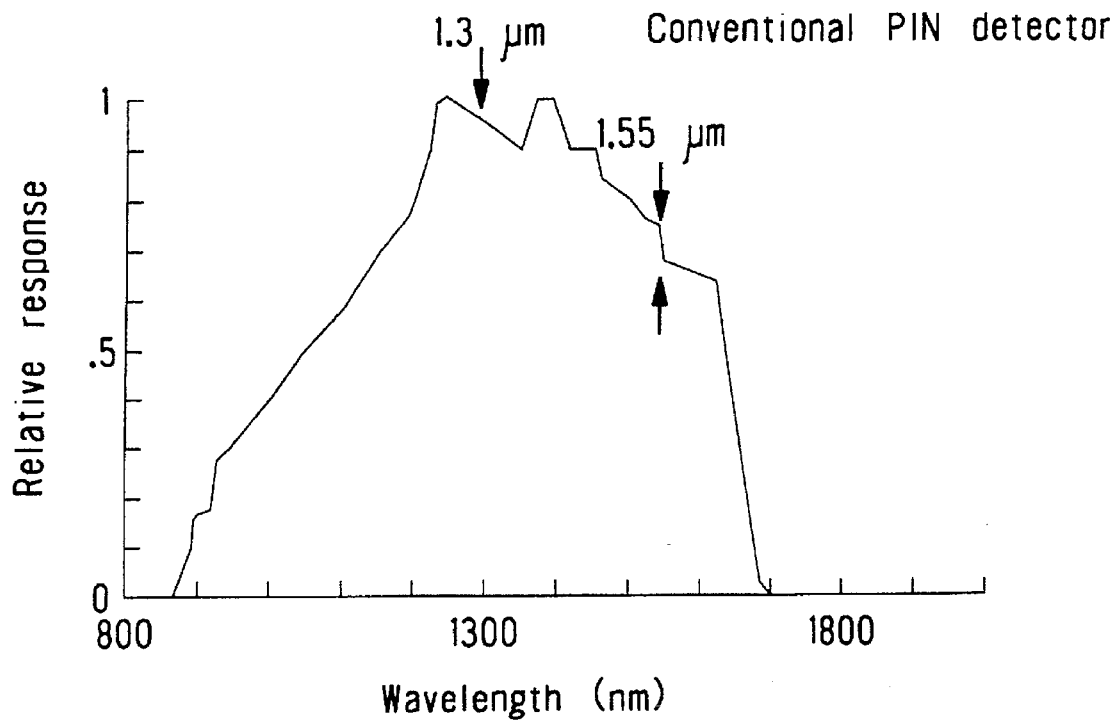
FIG. 6a is a graph of the relative response versus incident wavelength for a conventional PIN detector.
Figure 6B:
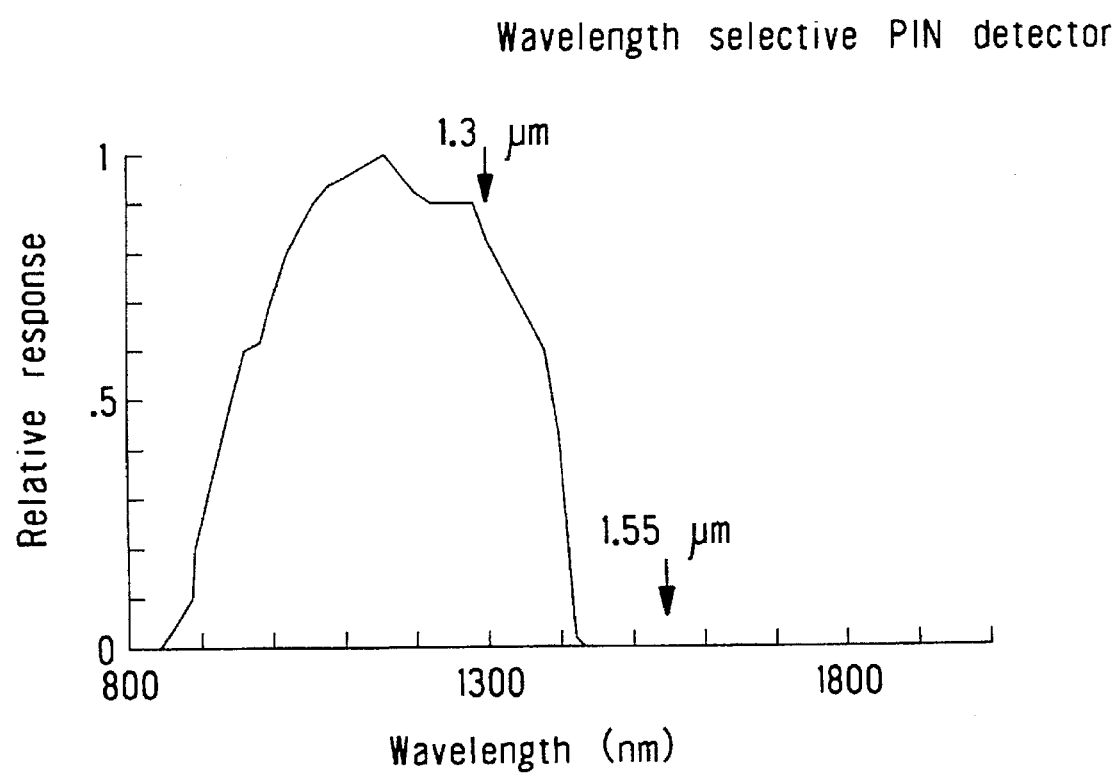
FIG. 6b is a graph of the relative response versus incident wavelength for the wavelength selective PIN detector of the present invention.

FIG. 6a is a graphical representation of the responsivity of a standard PIN detector as a function of the wavelength of incident light, and a typical response curve of the wavelength selective PIN detector is shown in FIG. 6b. As is shown in the Figure, the standard PIN detector will detect light at both 1.3 and 1.55 microns, since quanta of light at this wavelength are sufficient to excite electrons from the valence band to the conduction band in the photosensitive intrinsic layer of the photodetector. Accordingly, such a detector is not functionally useful for an in-line dual wavelength link as is the present invention. However, the wavelength selective PIN detector of the present invention is photosensitive at a wavelength of 1.3 microns and is transparent at 1.55 microns as shown in FIG. 6b. This is due to the greater bandgap of the $In_xGa_{1-x}As_yP_{1-y}$ intrinsic layer as compared with the 0.75 eV bandgap of $In_xGa_{1-x}As$ of the conventional detector. Quanta of light of wavelength 1.3 microns have the energy needed to excite valence band electrons into the conduction band, whereas quanta of light of 1.55 micron wavelength light do not. Accordingly, 1.55 micron light is not absorbed, and the detector is transparent to this light. Thereby a detector with these characteristics can function in the bi-directional link described above.

While the invention has been shown and described with reference to the specific embodiments of a bi-directional link having a PIN photodetector having an intrinsic layer of quaternary material that is transparent to 1.55 micron light and photosensitive to light of 1.3 microns, it is clear that the ordinary skilled artisan will appreciate changes and variations that do not depart from the fundamental theme and spirit of the invention.

I claim:

1. A bi-directional optical link, comprising:
   a. A light source for transmitting light at a first wavelength;
   b. A photodetector in substantially linear arrangement with said light source for detection of light of a second wavelength; and
   c. An optical fiber for carrying light of said second wavelength to said photodetector and for carrying light of said first wavelength from said light source, said optical fiber in substantially linear arrangement with said photodetector and said light source.

2. A bi-directional optical link as recited in claim 1, wherein said photodetector is substantially transparent to said light at said first wavelength.

3. A bi-directional optical link as recited in claim 2, wherein said photodetector is a PIN photodiode.

4. A bi-directional link as recited in claim 1, wherein said link further comprises means for optically coupling light from said light source to said optical fiber.

5. A bi-directional link as recited in claim 1, wherein said light source is a laser.

6. A bi-directional link as recited in claim 1, wherein said light source is a light emitting diode.

7. A bi-directional link as recited in claim 1, wherein said light source is a vertical cavity surface emitting laser (VCSEL).

8. A bi-directional link as recited in claim 4, wherein said means for coupling light is integral with said photodetector.

9. A bi-directional optical link, comprising:
   a. A light source for transmitting light at a first wavelength;
   b. A PIN photodetector for detecting light at a second wavelength collinearly disposed relative to said light source, said PIN photodetector substantially transparent to said first wavelength;
   c. An optical fiber arranged collinearly with said photodetector for transmitting light to said photodetector and receiving light from said light source; and
   d. Means for coupling light from said light source to said fiber integral with said PIN photodetector, whereby light of said first wavelength is coupled through said PIN photodetector and to said fiber by said means for coupling light, and light of said second wavelength is detected by said detector and is not incident on said light source, said first and said second wavelength light being substantially isolated thereby.

10. A bi-directional link as recited in claim 9, wherein said light source is a laser.

11. A bi-directional link as recited in claim 9, wherein said light source is an LED.

12. A bi-directional link as recited in claim 9, wherein said light source is a VCSEL.

13. A bi-directional link as recited in claim 9, wherein means for coupling light is a refractive lens formed on said PIN photodetector.

14. A bi-directional link as recited in claim 9, wherein said means for coupling light is a holographic optical element formed on said PIN detector.

15. A bi-directional optical link, comprising:
   a light source for transmitting light at a first wavelength; a photodetector for detecting light at a second wavelength collinearly disposed relative to said light source, said photodetector having a bandgap energy greater than the energy corresponding to light of said first wavelength; an optical fiber collinearly arranged with said photodetector for transmitting light to said photodetector and receiving light from said light source; and a lens for coupling light from said light source to said fiber, said lens integral with said photodetector.

16. A bi-directional link as recited in claim 15 wherein said light source is a laser.

17. A bi-directional link as recited in claim 15 wherein said photodetector is a PIN photodetector.

18. A bi-directional optical link, comprising a light source for transmitting light at a first wavelength; and a photodetector for detection of light of a second wavelength, said photodetector having a bandgap energy greater than the energy corresponding to light of said first wavelength; and said photodetector and said light source are in a substantially linear arrangement.

19. A bi-directional optical link as recited in claim 18 wherein said photodetector is a PIN photodetector.

20. A bi-directional optical link as recited in claim 19 further comprising an optical fiber for carrying light of said first wavelength from said light source and for carrying light of said second wavelength to said photodetector, said fiber being in a substantially linear arrangement with said photodetector and said light source.

21. A bi-directional optical link as recited in claim 20 wherein said PIN photodetector has an intrinsic material layer of $In_xGa_{1-x}As_yP_{1-y}$.

22. A bi-directional link as recited in claim 18 wherein said link further comprises a lens integral with said photodetector.

23. A bi-directional link as recited in claim 18 wherein said link further comprises a holographic optical element integral with said photodetector.

24. A bi-directional link as recited in claim 18 wherein said light source is a VCSEL.

25. A bi-directional link as recited in claim 18 wherein said light source is a VCSEL and said VCSEL is stacked on said photodetector.

26. A bi-directional optical link comprising a light source for transmitting light at a first wavelength, and a photodetector for detecting light of a second wavelength, said photodetector and said light source being disposed in a substantially linear arrangement, characterized in that:
   said photodetector has a bandgap energy which is greater than the energy corresponding to said first wavelength.

27. A bi-directional optical link as recited in claim 26 wherein said photodetector is a PIN photodiode.

28. A bi-directional optical link as recited in claim 26 wherein said photodetector is a PIN photodiode having an intrinsic layer of quaternary material.

29. A bi-directional optical link as recited in claim 28 wherein said quaternary material is $In_xGa_{1-x}As_yP_{1-y}$.

30. A bi-directional optical link as recited in claim 27 wherein said intrinsic layer has a bandgap of approximately 0.89 eV.

* * * * *